US012673388B2

(12) United States Patent
Riolfatti et al.

(10) Patent No.: US 12,673,388 B2
(45) Date of Patent: Jul. 7, 2026

(54) METHOD FOR OPERATING A MACHINE FOR LASER MACHINING OF TUBES AND PROFILED SECTIONS WITH AN AUTOMATIC SYSTEM FOR THE APPLICATION OF THREADED INSERTS INTEGRATED IN THE MACHINE

(71) Applicant: ADIGE S.P.A., Levico Terme (IT)

(72) Inventors: Riccardo Riolfatti, Besenello (IT); Matteo Brigadue, Bedollo (IT); Giancarlo Capra, Carzano (IT)

(73) Assignee: ADIGE S.P.A., Levico Terme (IT)

( * ) Notice: Subject to any disclaimer, the term of this patent is extended or adjusted under 35 U.S.C. 154(b) by 527 days.

(21) Appl. No.: 18/276,472

(22) PCT Filed: Feb. 17, 2022

(86) PCT No.: PCT/IB2022/051404
§ 371 (c)(1),
(2) Date: Aug. 9, 2023

(87) PCT Pub. No.: WO2022/175855
PCT Pub. Date: Aug. 25, 2022

(65) Prior Publication Data
US 2024/0116138 A1     Apr. 11, 2024

(30) Foreign Application Priority Data
Feb. 22, 2021     (IT) ........................ 102021000003977

(51) Int. Cl.
*B23K 26/38*     (2014.01)
*B23K 26/08*     (2014.01)

(52) U.S. Cl.
CPC .......... *B23K 26/38* (2013.01); *B23K 26/0876* (2013.01)

(58) Field of Classification Search
None
See application file for complete search history.

(56) References Cited

U.S. PATENT DOCUMENTS

| | | | |
|---|---|---|---|
| 12,151,304 B2 * | 11/2024 | Ruetz ................. | B23K 26/0823 |
| 2008/0198485 A1 * | 8/2008 | Kosmowski ........... | H10P 72/50 |
| | | | 359/811 |

(Continued)

FOREIGN PATENT DOCUMENTS

| | | | | |
|---|---|---|---|---|
| CN | 101056737 A | * | 10/2007 | ................ F16B 5/08 |
| CN | 111054875 A | | 4/2020 | |

(Continued)

OTHER PUBLICATIONS

International Search Report, issued in PCT/IB2022/051404, mailed May 13, 2022, Rijswijk, NL.

*Primary Examiner* — Woody A Lee, Jr.
(74) *Attorney, Agent, or Firm* — ArentFox Schiff LLP; Michael Fainberg

(57)     ABSTRACT

A method for operating a machine for laser cutting of tubes and profiled sections is provided. The machine has a working head having a focusing device adapted to focus a laser beam on the surface of the tube or profiled section to be worked, a carriage on which the working head is mounted, and an automatic insert application system for placing a threaded insert in a housing formed in a wall of the tube or profiled section by the laser beam. The automatic insert application system is integrated into the machine and configured to operate in a coordinated manner with the working head.

6 Claims, 6 Drawing Sheets

(56) References Cited

U.S. PATENT DOCUMENTS

| | | | | |
|---|---|---|---|---|
| 2013/0020295 A1* | 1/2013 | Schopf | .................. | B23K 26/38 |
| | | | | 219/121.72 |
| 2019/0030649 A1* | 1/2019 | Ruetz | .................. | B23K 26/384 |
| 2019/0244309 A1* | 8/2019 | Ottnad | .................. | G06Q 50/04 |

FOREIGN PATENT DOCUMENTS

| | | | |
|---|---|---|---|
| CN | 111842769 A | 10/2020 |
| DE | 102004006407 A1 | 9/2005 |
| DE | 102016106067 A1 | 10/2017 |
| FR | 2313998 A1 | 1/1977 |

* cited by examiner

METHOD FOR OPERATING A MACHINE FOR LASER MACHINING OF TUBES AND PROFILED SECTIONS WITH AN AUTOMATIC SYSTEM FOR THE APPLICATION OF THREADED INSERTS INTEGRATED IN THE MACHINE

CROSS-REFERENCE TO RELATED APPLICATIONS

This application is a National Phase Application of PCT International Application No. PCT/IB2022/051404, having an International Filing Date of Feb. 17, 2022 which claims priority to Italian Application No. 102021000003977 filed Feb. 22, 2021, each of which is hereby incorporated by reference in its entirety.

FIELD OF THE INVENTION

This invention relates to a machine for the laser cutting of tubes and profiled sections.

In the following description and claims, the terms "tube" and "profiled section" are used to identify any elongated article having (barring machining tolerances) a uniform cross section along its longitudinal axis, the cross section being of any shape, whether closed (e.g., circular, rectangular, or square) or open (e.g., L, C, U, etc.). In addition, the terms "longitudinal" and "transverse" are used to identify the direction of the longitudinal axis of the tube or profiled section and respectively a direction orthogonal to the longitudinal direction.

BACKGROUND OF THE INVENTION

DE 102016106067 A1 describes a machine for the laser cutting of tubes or profiled sections configured to make threaded holes.

It is well known that, in the case of tubes or profiled sections having relatively thin walls, instead of making a threaded hole directly in the wall of the tube or profiled section, a threaded insert is sometimes applied in a housing made in the wall of the tube or profiled section. Said threaded insert bears the required threaded hole. FR 2313998 A1 describes an insert application system. DE 102004006407 A1 describes a machine for making chip removal holes and equipped with an insert application system.

In known machines for the laser cutting of tubes and profiled sections, the workpieces produced by the machine must be picked up for the manual insertion of threaded inserts by an operator, or for insertion of said inserts by an offline machine. This situation thus leads to relatively long production times.

SUMMARY OF THE INVENTION

The object of this invention is to provide a solution for reducing the production time of tubes and profiled sections equipped with threaded inserts.

This and other objects are fully achieved according to the present invention by a method for the operation of a machine for laser cutting of tubes and profiled sections as described and claimed herein.

Advantageous embodiments of the invention are the subject of the dependent claims, the content of which is to be understood as an integral and integrating part of the following description.

In summary, the invention is based on the idea of implementing a method for the operation of a machine for the laser cutting of tubes and profiled sections, said machine comprising a working head with a focusing device adapted to emit a laser beam focused on the surface of the tube or profiled section to be worked, a carriage on which the working head is mounted, said carriage being mounted in a translatable manner relative to the tube or profiled section being worked in both a first transverse direction and a second transverse direction orthogonal to the first transverse direction, said transverse directions being orthogonal to the longitudinal axis of the tube or profiled section being worked, and an automatic insert application system for placing a threaded insert into a housing formed in a wall of the tube or profiled section by means of said laser beam, said automatic application system being integrated into the machine and being configured to operate in a coordinated manner with said working head, wherein the automatic insert application system comprises a riveter provided with a threaded rotating pin configured to engage a threaded hole of the threaded insert for gripping and placing the threaded insert, wherein the working head and the riveter are mounted on said carriage in such a way as to be integral in translation therewith, both in said first transverse direction and in said second transverse direction, wherein the automatic insert application system further comprises an insert supply assembly and an insert picking seat configured to receive inserts individually from said insert supply assembly, said insert supply assembly and said insert picking seat being arranged adjacent to the carriage, wherein the automatic insert application system further comprises a proximity sensor configured to detect the presence of the threaded insert in the insert picking seat, wherein the method comprises the following steps:
a) forming a housing in the tube or profiled section by means of said working head,
b) moving said carriage from the tube or profiled section to the insert picking seat,
c) gripping a threaded insert from the insert picking seat by means of said riveter,
d) moving said carriage from the insert picking seat to the tube or profiled section,
e) placing the threaded insert into the housing of the tube or profiled section by means of said riveter, and
f) carrying out a cutting operation by means of said working head, wherein the proximity sensor is configured to change state due to the picking of the threaded insert from the insert picking seat and consequently provides a detection signal, and wherein step c) comprises the following steps:
c1) gripping the threaded insert by means of the riveter and lifting the threaded insert from the insert picking seat,
c2) determining, based on said detection signal, a detected picking height reached by the threaded insert during the picking, at which the proximity sensor has changed its state,
c3) comparing said detected picking height with an expected picking height depending on geometric parameters of the threaded insert, c4) if the detected picking height is different from the expected picking height, repositioning the threaded insert into the insert picking seat, releasing the threaded insert, and repeating steps c1)-c3), c5) if the detected picking height is still different from the expected picking height, discarding the threaded insert (I).

Due to such a method, a system fully integrated in the machine is used which allows threaded inserts of various sizes to be inserted into the tube or profiled section, previously cut with the laser; in this way the machine no longer produces only laser-cut pieces that must then be reworked to insert the inserts but rather finished workpieces ready for use.

There is therefore a clear reduction in production time.

Preferably, the automatic insert application system further comprises a linear actuator mounted on said carriage and on which the riveter is mounted, said linear actuator being configured to translate the riveter relative to said carriage in said second transverse direction, between a rest position and a working position.

Preferably, said carriage is configured to shuttle between the tube or profiled section and the insert picking seat to allow the riveter to grip the threaded insert from the insert picking seat and to allow the riveter to place the threaded insert onto the tube or profiled section, between a hole cutting operation and a subsequent cutting operation performed on the tube or profiled section by said working head.

According to an embodiment of the method, the presence sensor is further configured to change state due to the reception into the insert picking seat of the threaded insert supplied by the insert supply assembly, and consequently to provide a detection signal, and wherein step c) comprises, in the event that the threaded insert is not received into the insert picking seat, repeating the supply of the threaded insert from the insert supply assembly.

According to a further embodiment of the method, the step e) comprises the following steps:

e1) lowering the riveter with the threaded insert until the housing of the tube or profiled section is engaged, e2) determining a detected working height achieved by the riveter, e3) comparing said detected working height with an expected working height, depending on the dimensions of the tube or profiled section, e4) if the detected working height is different from the expected working height, discarding the threaded insert.

According to a further embodiment of the method, step a) is carried out based on input data comprising an instructed position of the centroid of the housing in the tube or profiled section, and geometric parameters of the threaded insert to be applied.

BRIEF DESCRIPTION OF THE DRAWINGS

Further features and advantages of this invention will become clear from the detailed description that follows, given purely by way of non-limiting example with reference to the accompanying drawings, wherein.

DETAILED DESCRIPTION

Figures 1, 2:
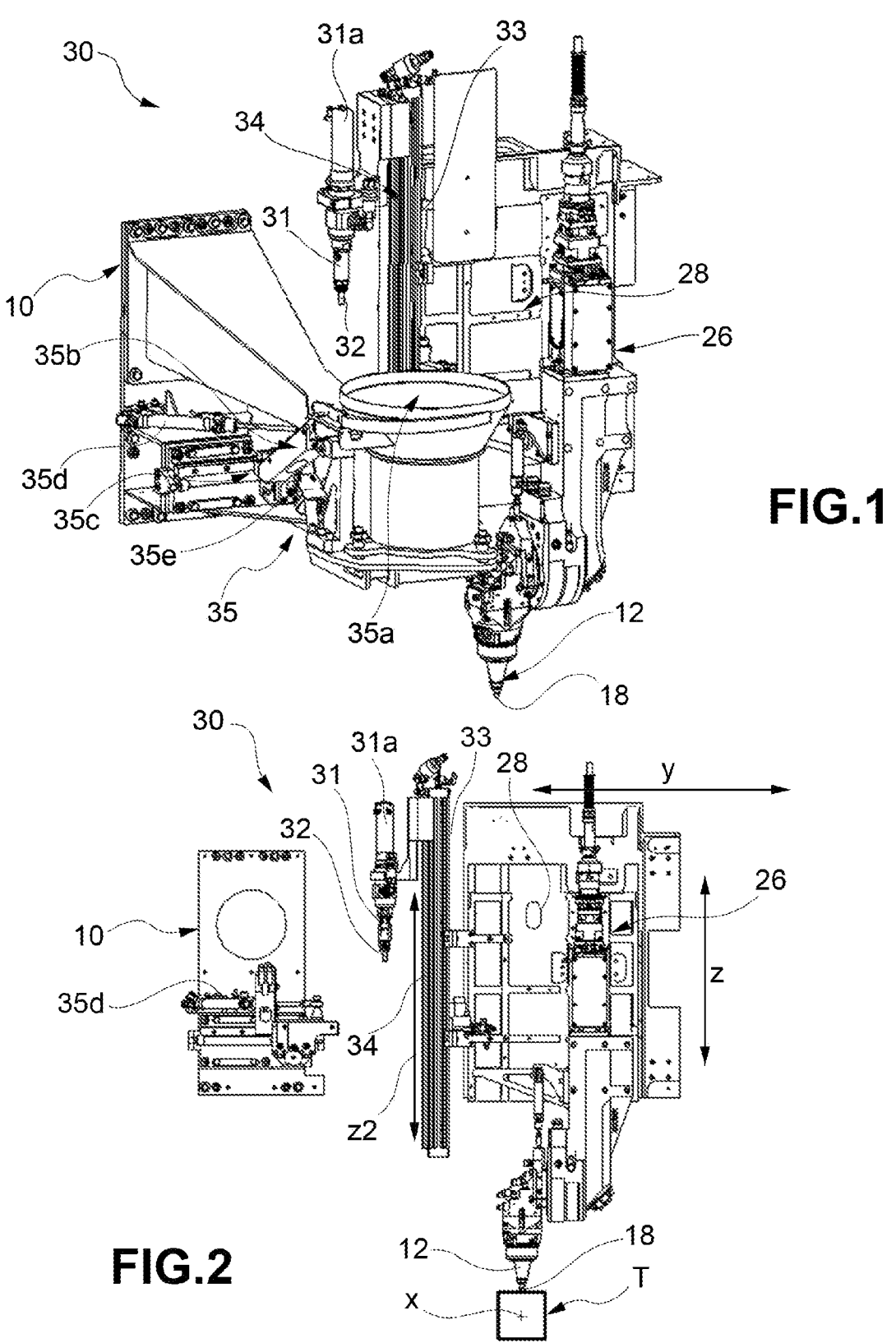
FIG. 1 is a perspective view partially showing a machine for the laser machining of tubes or profiled sections provided with an automatic insert application system according to an embodiment of this invention.
FIG. 2 to 8 are front elevation views representing the machine in FIG. 1 in different stages of operation.

The machine for the laser machining of tubes and profiled sections that is the subject of this invention is described and illustrated herein with reference to its application for machining tubes, but it is understood that it is equally usable for machining profiled sections. The tubes or profiled sections on which the machine is able to work may have cross sections of different shapes and sizes.

Referring to the figures, a machine for the laser machining of tubes according to an embodiment of this invention comprises, in a manner known per se, a base 10, a working head 12 adapted to carry out a laser cutting process on a tube T (shown in FIG. 2 to 8), a supply device (not shown) adapted to advance the tube T along a longitudinal direction x (coincident with the direction of the longitudinal axis of the tube T and orthogonal to the page of the drawings of FIG. 2 to 8), a guide device (not shown) adapted to guide the tube T as it is moved forward by the supply device, and a scanning system (not shown) adapted to scan at least one portion (e.g., an upper portion) of the profile of the cross section of the tube T.

The working head 12 comprises, in a manner known per se, a focusing device 18 adapted to emit a laser beam focused on the surface of the tube T. The working head 12 is carried by a head support structure 26. The head support structure 26, and thus with it also the working head 12, is mounted on a carriage 28 so as to be movable in the vertical direction (direction z). In turn, the carriage 28 is mounted so as to be translatable in a transverse direction (direction y) relative to the base 10 of the machine. Although in the embodiment shown in the figures the transverse direction y is a horizontal direction, it could also be a direction inclined at a certain angle to the horizontal (while obviously lying in a plane perpendicular to the longitudinal axis of the tube). Thus, the working head 12 is movable in the vertical transverse plane, i.e., in a plane perpendicular to the longitudinal axis x of the tube T, with two degrees of freedom, namely, with one degree of freedom of translation in the vertical direction and with one degree of freedom of translation in the transverse direction. Further, as provided in the illustrated example embodiment, the working head 12 may be mounted on the head support structure 26 so as to be able to oscillate about a transversely directed axis of oscillation (or, according to an embodiment not shown, about two axes of oscillation orthogonal to each other).

The machine supply device is preferably arranged to drive not only a translational movement of the tube T along the direction of the longitudinal axis x (a forward movement or even a backward movement while working the workpiece), but also a rotation movement of the tube T about the longitudinal axis x. In the case of a laser cutting machine for tubes, the combination of the degrees of freedom of movement of the working head 12 (translation along the vertical direction z, translation along the transverse direction y, rotation about the axis of oscillation and, possibly, translation also along the direction of the longitudinal axis x) and the degrees of freedom of movement of the tube T (translation along the direction of the longitudinal axis x and rotation about the longitudinal axis x) makes it possible to make a cut on the wall of the tube T along any cutting line.

The machine further comprises an automatic insert application system, indicated collectively with 30. Such a system is configured to place a threaded insert I (shown in FIGS. 9 and 10) into a corresponding hole or housing H preliminarily formed in a wall w of the tube or profiled section T by laser machining. The automatic insert application system 30 is integrated into the machine and is configured to operate in coordination with the working head 12.

Figures 9, 10, 11:
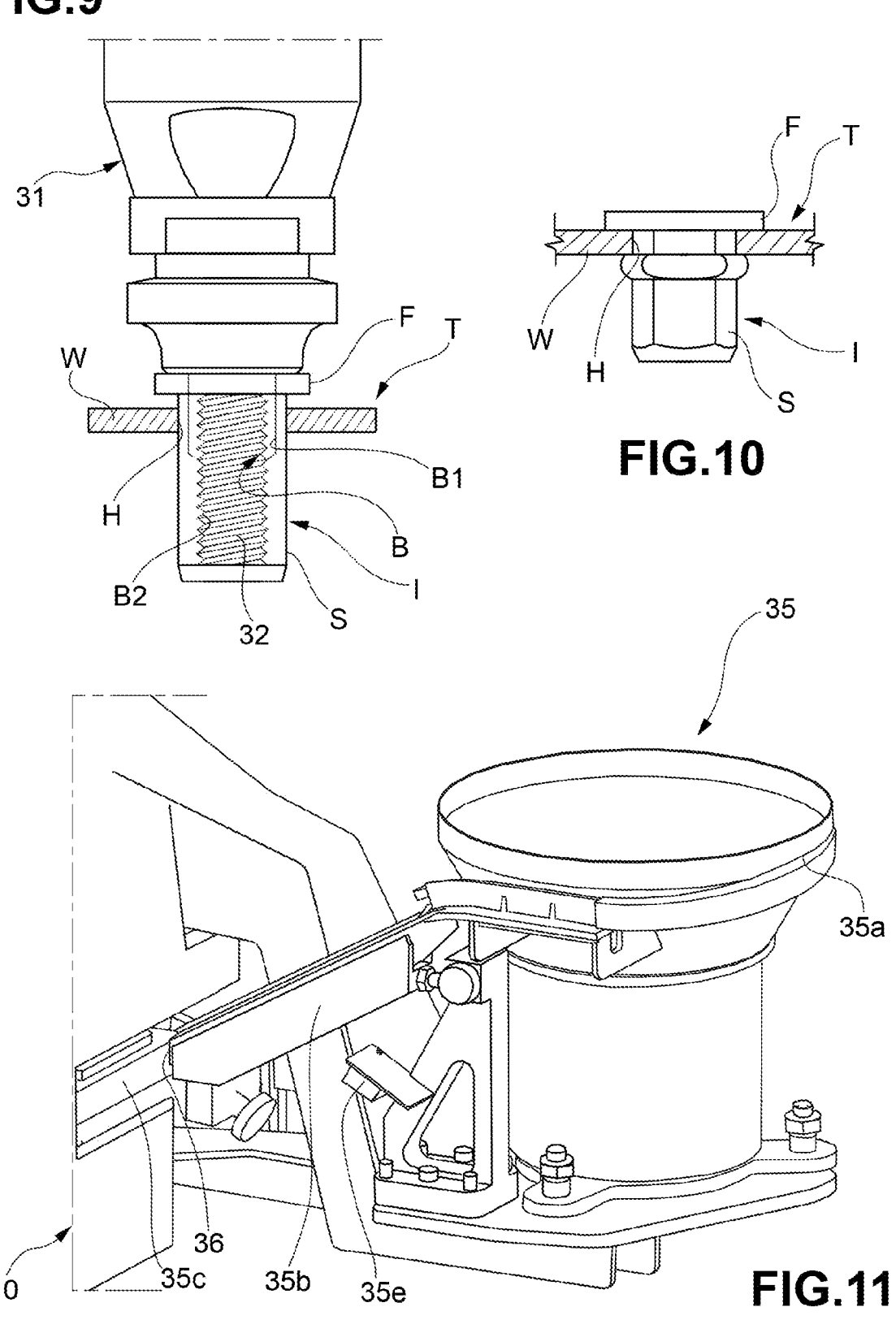
FIG. 9 is a front elevation view depicting a riveter of the machine in FIG. 1 while placing a threaded insert on a tube or profiled section.
FIG. 10 is a front elevation view representing the threaded insert applied on the tube or profiled section.
FIGS. 11 and 12 are perspective views representing a part of the automatic insert application system of the machine in FIG. 1.

Inserts applicable with the machine according to the invention are, for example, standard inserts comprising a bushing body having an outer surface S with a polygonal cross section, in particular hexagonal, and a flange or head F formed at a proximal end of the bushing body. A threaded hole B is formed in the bushing body, which comprises a proximal segment B1 having a larger diameter and arranged at the head F, and a distal segment B2 having a smaller diameter and provided with a threading. Examples of standard inserts applicable with the machine according to the invention are open hexagonal inserts M4, M5, M6, M8 with cylindrical head, closed hexagonal inserts M4, M5, M6, M8 with cylindrical head, open hexagonal inserts M4, M5, M6, M8 with reduced head and closed hexagonal inserts M4, M5, M6, M8 with reduced head. FIGS. 9 and 10 show an open hexagonal insert with a cylindrical head.

The automatic insert application system 30 comprises a riveter 31 of a type known per se, said riveter provided with a threaded rotating pin 32 configured to engage the threaded hole B of the threaded insert I for gripping and placing the threaded insert I. To this end, the riveter 31 comprises, in a manner known per se, a motor or actuator 31*a* to drive the rotation of the threaded pin 32. The placement of the threaded insert I takes place by forcefully inserting, by means of the riveter 31, the threaded insert I into the housing H until the head F comes into contact with the wall w of the tube or profiled section T; subsequently, the riveter 31 is slightly extracted causing the deformation of a part of the insert comprised between the distal threaded segment B2 and the wall w of the tube or profiled section T and which has a reduced thickness due to the presence of the hole segment B1 of larger diameter (see FIG. 10); in this way the wall w of the tube or profiled section T is clamped between the head F and the deformed part of the threaded insert. Lastly, the riveter 31 is removed by unscrewing the threaded pin 32 from the threaded insert I so anchored.

The riveter 31 is mounted on a support structure 33, which in turn is attached to the carriage 28. The riveter 31 thus moves together with the carriage 28, and thus also together with the working head 12. The riveter 31 is thus translationally integral with the working head 12 both in the transverse direction y and in the vertical direction z. Advantageously, the position of the riveter 31 will be precisely on the same plane yz (orthogonal to the axis x of the tube or profiled section) of the working head 12; in this way, after having cut the hole in the tube or profiled section T with the working head 12, by moving only the y and z axes it is possible to bring the riveter 31 to insert the insert I in the same hole without needing to move the tube or the profiled section T being worked and/or to move the riveter 31 with further controlled axes.

A linear actuator 34 is interposed between the support structure 33 and the riveter 31, which is configured to move the riveter 31 relative to the carriage 28 and thus the working head 12 along a direction parallel to the z axis. In particular, the riveter 31 is movable between a rest position corresponding to an upper end position of the linear actuator 34 (shown in FIGS. 1 and 2), and a working position corresponding to a lower end position of the linear actuator 34 (shown in FIG. 7). The stroke of the riveter 31 is represented by the arrow z2 in FIG. 2 to 8.

Figure 12:
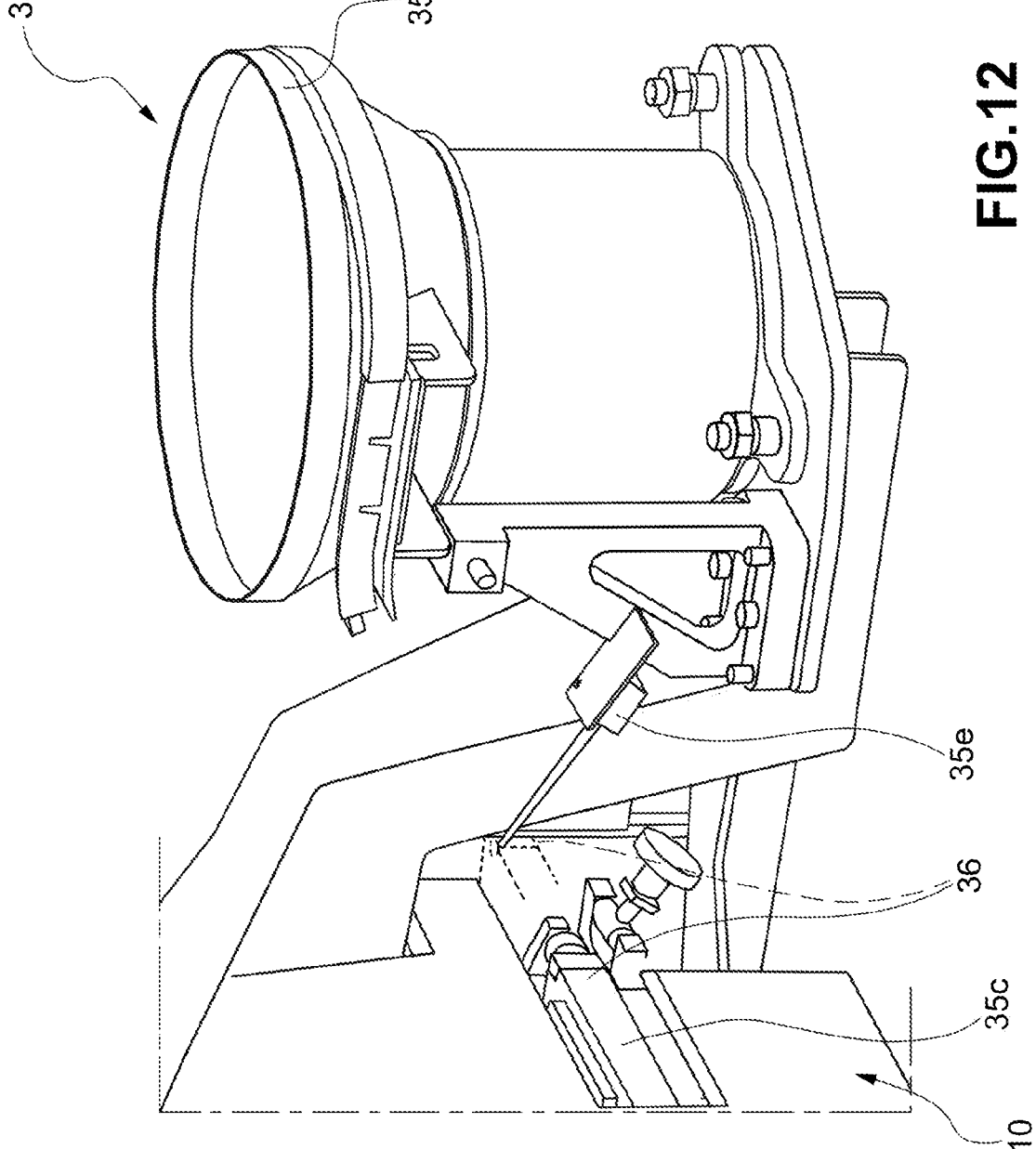

The automatic insert application system 30 further comprises a part which is integral with the base 10. Said part comprises an insert supply assembly 35, which in the illustrated example comprises a vibrating cup supply device 35*a* having an outlet connected to a chute 35*b*. The chute 35*b* serves as a single-line feeder for a picking carriage 35*c*, visible in FIGS. 11 and 12; in other words, the chute 35*b* supplies threaded inserts I to the picking carriage 35*c* one at a time. An insert picking seat 36 is formed in the picking carriage 35*c*, which in a retracted position of the picking carriage 35*c* faces an outlet of the chute 35*b*. In FIG. 12, the chute 35*b* has been removed to make the insert picking seat 36 more visible.

The insert picking seat 36 is configured to receive only one threaded insert I at a time and is also shaped to prevent the threaded insert received therein from rotating about its central axis.

The picking carriage 35*c* is movable from the retracted position shown in FIGS. 11 and 12 to a forward position shown in FIG. 2 to 8; an actuator 35*d* is intended for this movement. The picking carriage 35*c* in its forward position allows the metal insert I to be picked up by the riveter 31, in the manner that will be described below. To prevent the threaded insert I from falling out of the insert picking seat 36 during the forward movement of the picking carriage 35*c* from the retracted position to the forward position, a guide (not shown) is provided, arranged alongside the picking carriage 35*c*. The above configuration allows the insert picking seat 36 to receive inserts I individually, such that they may be processed by the riveter 31.

As may be seen in FIG. 1 to 8, the insert supply assembly 35 and the insert picking seat 36 are arranged next to the carriage 28 and thus the riveter 31. The carriage 28 is therefore configured to shuttle between the tube or profiled section T and the insert picking seat 36 to allow the riveter 31 to grip the threaded insert I from the insert picking seat 36 and allow the riveter 31 to place the threaded insert on the tube or profiled section T, between a hole cutting operation and a subsequent cutting operation carried out on the tube or profiled section T by the working head 12. For the purposes of this invention, "hole cutting operation" means an operation in which the hole or housing H is formed in the wall w of the tube or profiled section T. "Cutting operation" means more generally any laser cutting operation performed on the tube or profiled section T, including the aforesaid hole cutting.

On board the supply assembly 35 a presence sensor 35*e*, such as a photocell, is also arranged configured to detect the presence of the threaded insert I in the insert picking seat 36 when the picking carriage 35*c* is found in its forward position. The position of the insert picking seat 36 with the picking carriage 35*c* in the forward position is shown with a dashed line in FIG. 12.

With reference to FIG. 2 to 8, a procedure for operating the machine described above will now be described.

FIG. 2 shows a hole cutting step by means of laser cutting of the tube or profiled section T. In this step, a housing H is formed in the tube or profiled section T by means of the working head 12. During laser cutting, the riveter 31 in the resting position remains out of the way, allowing the machine to work without limitations.

Figures 3, 4:
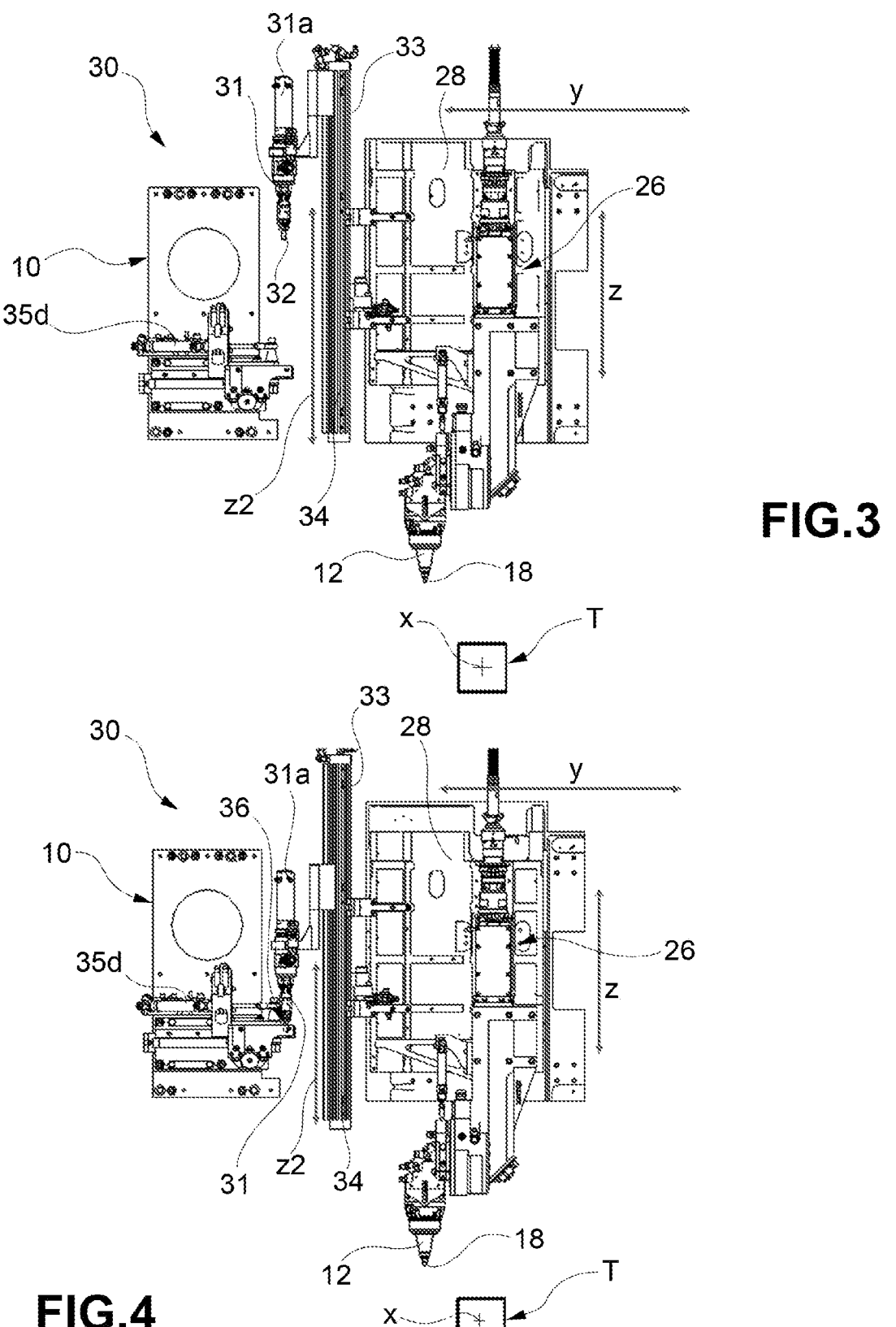

FIG. 3 shows a preparation step for picking the insert I. In this step, the carriage 28 is moved from the tube or profiled section T to the insert picking seat 26. Specifically, by moving the y and z axes that move the carriage 28 and the cutting head 12, the riveter 31 is positioned vertically on the axis of the insert I, which is located in the insert picking seat 36 with the carriage 35c in the forward position.

FIG. 4 shows a lowering step of the riveter 31 in the picking position. By lowering the riveter 31 with the linear actuator 34 to an intermediate position, preparation is made for picking up the insert I (the type of linear actuator used must be such as to permit an intermediate stop between the two end positions).

Figures 5, 6:
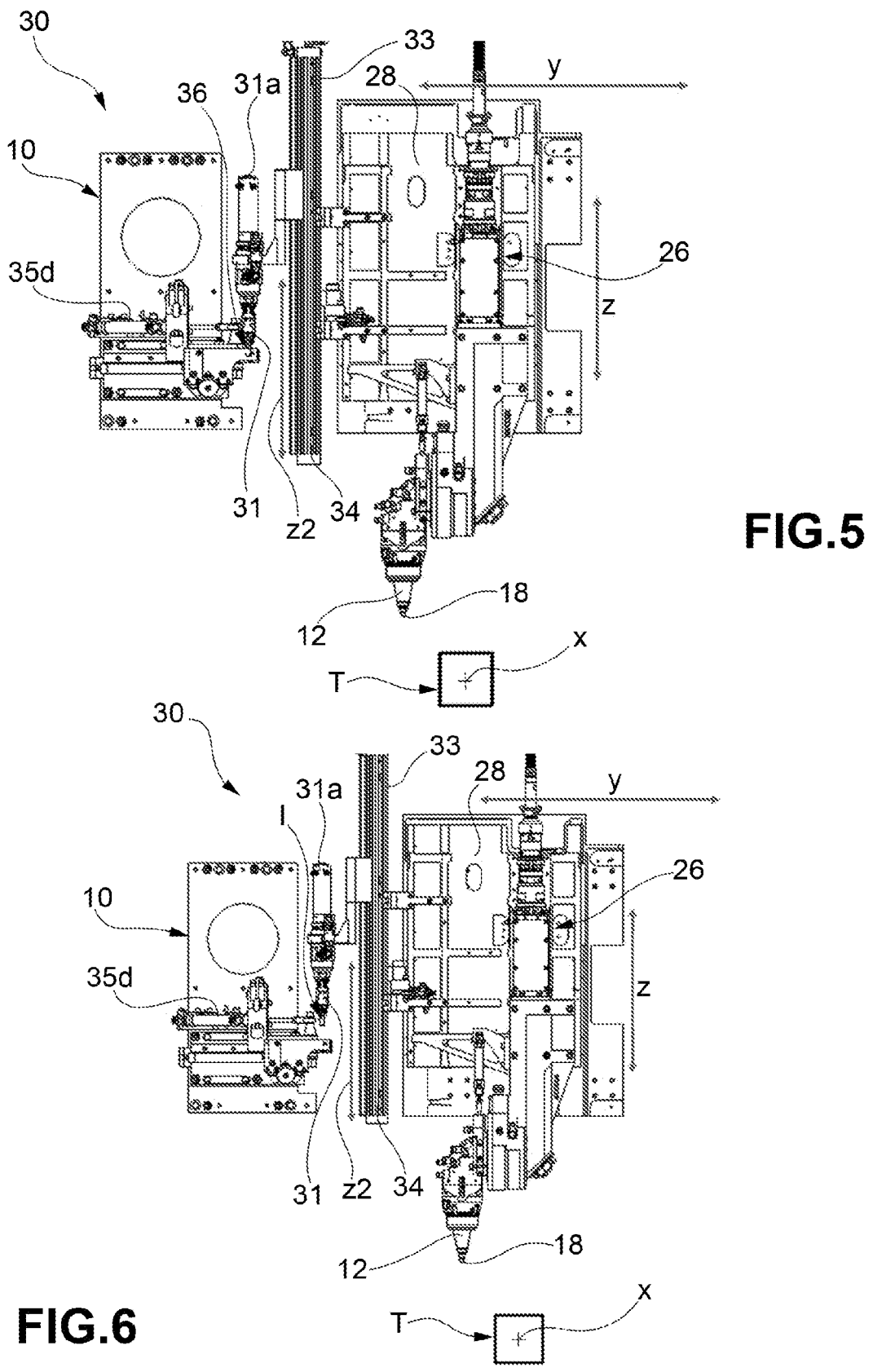

FIG. 5 shows an insert picking step. By lowering the carriage 8 with the z axis while the threaded pin 32 of the riveter 31 is rotated so as to engage the threaded hole B of the insert I, the insert I is gripped by the riveter 31.

FIG. 6 shows a riveter exiting step with insert. In this step, by raising the carriage 28 with the z axis, the riveter 31 extracts the insert I from the insert picking seat 36 and is ready for the application step in the previously made hole or housing H.

Figures 7, 8:
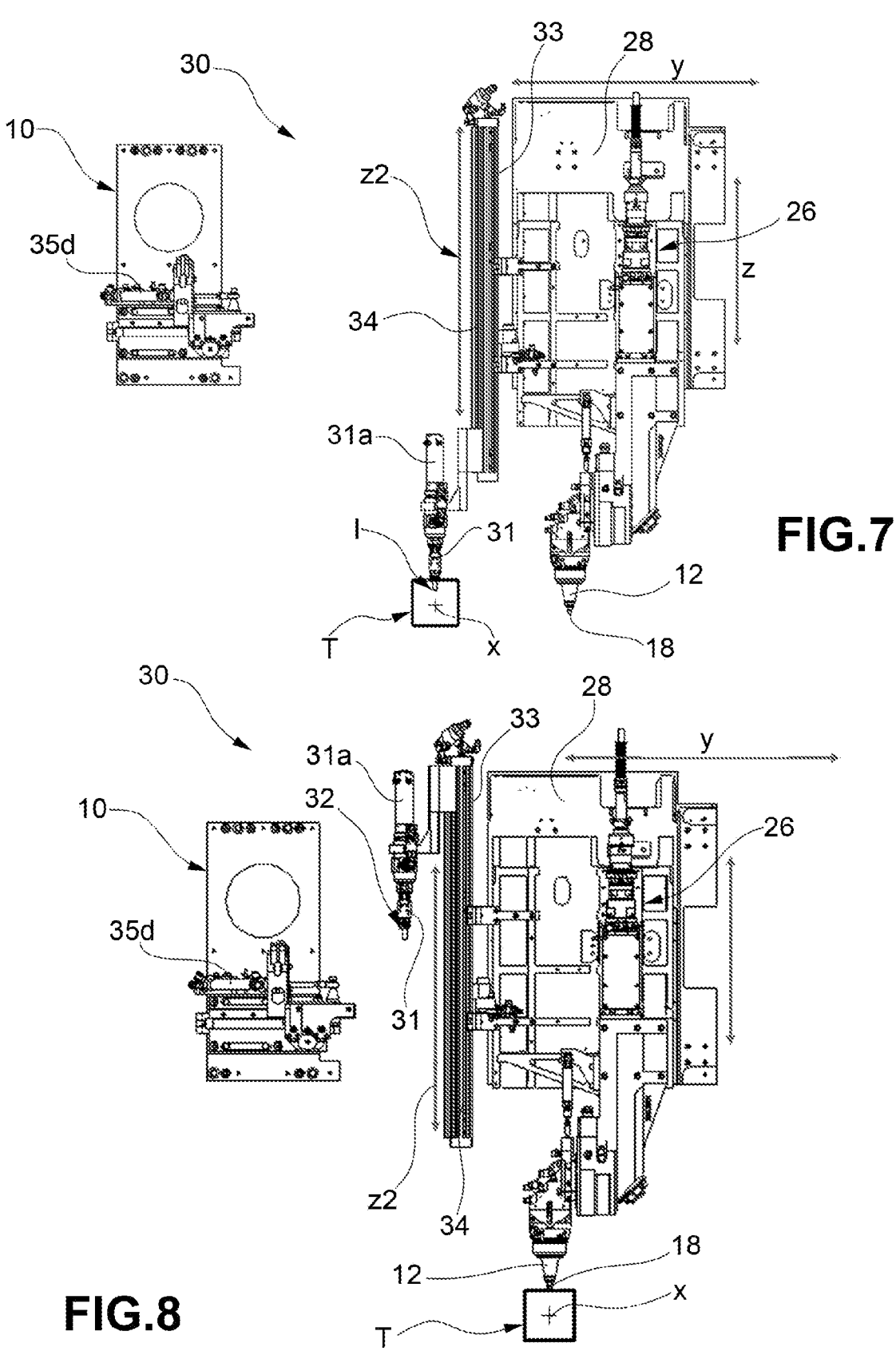

FIG. 7 shows an insert application step on the tube or profiled section being worked. By moving the y and z axes of the carriage 28 and the cutting head 12 to the appropriate position, the riveter 31 applies the insert I into the previously formed hole or housing H. Note that the riveter 31 is further moved to its lower end position or working position. To accomplish the anchoring of the threaded insert I to the wall w of the tube or profiled section T, the riveter 31 operates in the manner described above with reference to FIGS. 9 and 10.

Lastly, a step of returning to the cutting position is shown in FIG. 8. By raising the riveter 31 by means of the linear actuator 34 and appropriately moving the y and z axes of the carriage 28, it returns to the laser cutting step by means of the working head 12.

Preferably, the automatic controls of the machine described above comprise a procedure for checking the insert type and the proper picking of the insert from the insert picking seat. To this end, the presence sensor 35e is configured to change state due to the picking of the threaded insert I from the insert picking seat 36 and consequently provide a detection signal. For example, in the case wherein the presence sensor 35e is a photocell operating on the insert I by reflection, when the insert I is present in the insert picking seat 36, the presence sensor 35e may be in an energized state, and when the insert I is absent, the presence sensor 35e may be in a de-energized state.

When the threaded insert I gripped by the riveter 31 is raised from the insert picking seat 36, it is envisaged that the presence sensor 35e will de-energize at a precise height z depending on the type of insert being processed (expected picking height). The automatic control of the machine thus makes a comparison between the expected picking height and the height reached by the riveter 31 when the change in state of the presence sensor 35e is detected (detected picking height). If the detected picking height corresponds to the expected one, the subsequent steps taken are moving the carriage 28 and the riveter 31 for the application of the insert I on the tube or profiled section T. If, on the other hand, the detected picking height does not correspond to the expected picking height, it means that:

the insert picked is of an incorrect format, or the insert was not screwed in properly by the riveter 31.

A new picking attempt is then made with the same insert.

If this new attempt also fails, again using only the y and z axes of the machine, the riveter 31 positions itself near the picking point where a small pneumatic clamp (not shown) is provided that grips the insert to be discarded and holds it so that the riveter 31 may be unscrewed therefrom; subsequently the clamp opens and the defective insert falls into a shaft intended for cutting waste (not shown) and the riveter 31 starts up again for a new picking.

Preferably, the automatic controls of the above-described machine further comprise a procedure for also checking the presence of the insert in the insert picking seat 36 with the picking carriage 35c in the forward position: it may occur, in fact, that, in the transition between the supply chute 35b and the selector carriage 35c, the insert does not descend and therefore the selector carriage 35c exits empty; in this case, the presence sensor 35e does not change state upon the arrival of the selector carriage 35c (because the insert is not present), and therefore orders a second picking attempt. Air blowers (not shown) arranged along the chute and blowing in the direction of descent may be provided to aid in the descent of the insert from the chute 35b.

Preferably, the automatic controls of the above-described machine further comprise a procedure for checking the correct insertion of the insert into the tube or profiled section.

When the machine introduces the insert I into the housing H, which has been previously cut by laser, it should find itself in the position shown in FIG. 7.

This position corresponds to a) linear actuator 34 moving the riveter 31 in the lower end position, b) a precise height z, known as a function of the dimensions of the tube or profiled section being worked.

If one of these two conditions is not fulfilled, it means that something went wrong, and the insertion did not take place correctly (the position of the carriage of the cylinder on which the riveter 31 is fixed is controlled through a linear transducer positioned parallel to the linear actuator). In case of failed insertion, to discard the insert, the riveter will subsequently position itself at the pneumatic clamp described above.

Preferably, the automatic controls of the above-described machine further comprise a procedure for preparing the housing for the threaded insert by means of laser cutting.

The application process of a threaded insert on a laser cutting system for tubes involves first removing the material from the tube or profiled section where the threaded insert is to be applied.

Said area is defined as the housing of the threaded insert.

The removal of the material to form the housing is carried out by laser machining.

Such machining is referred to as preparatory laser geometry.

Preparatory laser geometry involves cutting a polygonal geometry, in particular hexagonal, oriented in a manner consistent with the orientation assumed by the threaded insert during the selection and picking process. This orientation is preserved by the riveter 31 and is always the same to ensure proper insertion of the threaded insert into the housing.

The method with which the process of programming and executing preparatory laser geometry is now described.

CAD/CAM Programming (Office)

In the CAD/CAM programming environment for planning the work to be performed on the tube, it is not necessary to draw the preparatory laser geometry.

In this environment it is only necessary to insert a position reference (placeholder), corresponding to the centroid of where the threaded insert is to be applied.

Programming in Machine

On the machine, it is sufficient to assign a certain type of threaded insert to the placeholder inserted during CAD/CAM programming.

A threaded insert is described by means of a series of geometric parameters that also allow the machine to know the size and shape of the housing.

Due to the descriptive information of the threaded insert and knowing the orientation of said insert on the riveter 31, the machine performs the preparatory geometry automatically, with the position reference determined by the placeholder. If needed, the user has the possibility to parametrically adjust the dimensions and apply particular laser cutting parameters.

Naturally, without prejudice to the principle of the invention, the embodiments and details of construction may vary widely relative to that which has been described and illustrated purely by way of non-limiting example, without thereby departing from the scope of the invention as defined in the accompanying claims.

The invention claimed is:

1. A method for operating a machine for laser cutting of tubes and profiled sections comprising:

a working head provided with a focusing device adapted to emit a focused laser beam onto a surface of a tube or profiled section to be worked, and a carriage on which the working head is mounted, said carriage being mounted so as to translate relative to the tube or profiled section to be worked both in a first transverse direction and in a second transverse direction orthogonal to the first transverse direction, said first and second transverse directions being orthogonal to a longitudinal axis of the tube or profiled section to be worked, and an automatic insert application system for placing a threaded insert into a housing formed in a wall of the tube or profiled section by said laser beam, said automatic insert application system being integrated into the machine and being configured to operate in a coordinated manner with said working head, wherein said automatic insert application system comprises a riveter provided with a threaded rotating pin configured to engage a threaded hole of the threaded insert for gripping and placing the threaded insert, wherein the working head and the riveter are mounted on said carriage so as to be translationally integral therewith in both said first transverse direction and in said second transverse direction, wherein said automatic insert application system further comprises an insert supply assembly and an insert picking seat configured to receive threaded inserts individually from said insert supply assembly, said insert supply assembly and said insert picking seat being arranged adjacent to the carriage, wherein the automatic insert application system further comprises a proximity sensor configured to detect a presence of the threaded insert in the insert picking seat, wherein the method comprises the following steps:

a) forming a housing in the tube or profiled section by said working head, b) moving said carriage from the tube or profiled section to the insert picking seat,

c) gripping a threaded insert from the insert picking seat by said riveter, d) moving said carriage from the insert picking seat to the tube or profiled section, e) placing the threaded insert into the housing of the tube or profiled section by said riveter, and f) carrying out a cutting operation by said working head, wherein the proximity sensor is configured to change its state due to picking of the threaded insert from the insert picking seat and consequently provide a detection signal, and wherein step c) comprises the following steps:

c1) gripping the threaded insert by the riveter and lifting the threaded insert from the insert picking seat, c2) determining, based on said detection signal, a detected picking height reached by the threaded insert during the picking, at which the proximity sensor has changed its state, c3) comparing said detected picking height with an expected picking height depending on geometric parameters of the threaded insert, c4) if the detected picking height is different from the expected picking height, repositioning the threaded insert into the insert picking seat, releasing the threaded insert, and repeating steps c1-c3, c5) if the detected picking height is still different from the expected picking height, discarding the threaded insert.

2. The method of claim 1, wherein the automatic insert application system further comprises a linear actuator mounted on said carriage, and wherein the riveter is mounted on the linear actuator, said linear actuator being configured for translationally moving the riveter relative to said carriage in said second transverse direction, between a rest position and a working position.

3. The method of claim 1, wherein said carriage is configured to shuttle between the tube or profiled section and the insert picking seat to enable the riveter to grip the threaded insert from the insert picking seat and enable the riveter to place the threaded insert onto the tube or profiled section, between a hole cutting operation and a subsequent cutting operation carried out on the tube or profiled section by said working head.

4. The method of claim 1, wherein the proximity sensor is further configured to change its state due to reception, in the insert picking seat, of the threaded insert supplied by the insert supply assembly, and consequently to provide a detection signal, and wherein step c) comprises, in case of failed reception of the threaded insert in the insert picking seat, repeating a supply of the threaded insert by the insert supply assembly.

5. The method of claim 1, wherein step e) comprises the following steps:

e1) lowering the riveter with the threaded insert until the housing of the tube or profiled section is engaged, e2) determining a detected working height reached by the riveter, e3) comparing said detected working height with an expected working height depending on dimensions of the tube or profiled section, e4) if the detected working height is different from the expected working height, discarding the threaded insert.

6. The method of claim 1, wherein step a) is carried out based on input data comprising an instructed position of a centroid of the housing in the tube or profiled section, and geometric parameters of the threaded insert to be applied.

\* \* \* \* \*